(12) United States Patent
Craswell et al.

(10) Patent No.: US 7,792,799 B2
(45) Date of Patent: Sep. 7, 2010

(54) BACKING UP A WIRELESS COMPUTING DEVICE

(75) Inventors: Ronald J. Craswell, Redmond, WA (US); David S. Pratt, Jr., Seattle, WA (US); Paul J. H. Klassen, Newcastle, WA (US)

(73) Assignee: Perlego Systems, Inc., Gig Harbor, WA (US)

( * ) Notice: Subject to any disclaimer, the term of this patent is extended or adjusted under 35 U.S.C. 154(b) by 220 days.

(21) Appl. No.: 10/538,795

(22) PCT Filed: Oct. 10, 2003

(86) PCT No.: PCT/US03/32295

§ 371 (c)(1),
(2), (4) Date: Mar. 6, 2006

(87) PCT Pub. No.: WO2004/034286

PCT Pub. Date: Apr. 22, 2004

(65) Prior Publication Data

US 2006/0230081 A1    Oct. 12, 2006

Related U.S. Application Data

(60) Provisional application No. 60/417,795, filed on Oct. 10, 2002.

(51) Int. Cl.
*G06F 17/30* (2006.01)
(52) U.S. Cl. ...................... 707/640; 707/682
(58) Field of Classification Search ............... 707/200, 707/201, 204, 202, 10, 609, 640, 641, 648, 707/649, 650, 652, 653, 654, 662, 663, 665, 707/666, 674, 679, 680, 682; 711/161, 162, 711/164; 705/1.1, 50, 60
See application file for complete search history.

(56) References Cited

U.S. PATENT DOCUMENTS

| 5,392,390 | A | 2/1995 | Crozier |
| 5,778,395 | A | 7/1998 | Whiting et al. |
| 6,345,281 | B1 | 2/2002 | Kardos et al. |
| 6,516,316 | B1 * | 2/2003 | Ramasubramani et al. ..... 707/9 |
| 6,609,138 | B1 * | 8/2003 | Merriam ................. 707/204 |
| 6,865,655 | B1 * | 3/2005 | Andersen ................ 711/162 |
| 7,240,079 | B2 * | 7/2007 | Markkanen .............. 707/204 |
| 2002/0156921 | A1 * | 10/2002 | Dutta et al. ............. 709/246 |
| 2003/0018657 | A1 * | 1/2003 | Monday ................. 707/204 |

* cited by examiner

*Primary Examiner*—Greta L Robinson
(74) *Attorney, Agent, or Firm*—Schwabe, Williamson & Wyatt P.C.

(57) ABSTRACT

A method and apparatus are provided to backup and restore data (410) from/to wireless computing devices, utilizing strongly collision free deterministic identifiers.

15 Claims, 14 Drawing Sheets

BACKING UP A WIRELESS COMPUTING DEVICE

CROSS REFERENCE TO RELATED APPLICATIONS

This application claims the benefit of U.S. Provisional Application No. 60/417,795, filed on Oct. 10, 2002, and entitled SHARED INCREMENTAL BACKUP, the subject matter of which is incorporated herein by reference.

FIELD OF THE INVENTION

The present invention relates to the fields of data processing and wireless communications. More specifically, the present invention relates to the provision of backup and restoration services, having particular application to wireless computing devices.

BACKGROUND OF INVENTION

Ever since the dawn of computing, users have had the need to backup data, especially critical data. A number of backup techniques including incremental backups are known in the art. However, conventional backup techniques have been found to be inefficient in a number of situations, including in particular, the backup of wireless devices.

Since their introduction, the capabilities, features and services of wireless devices has steadily increased, while the cost of ownership and operation has decreased. At first, these mobile devices operated on analog wireless network that enabled voice communication and simple paging features. Later, digital wireless networks were introduced for cellular telephone communications as well as data communications. Such digital wireless networks allowed more advanced features such as encryption, color identification and the transmission and receipt of text messages (e.g., short message service "SMS" text messages).

As more and more data services are consumed using wireless mobile devices, more user data in particular, important, sensitive and/or critical data are being stored on the wireless mobile devices, requiring these data to be backed up. Conventional backup through the wireless network even when done on an incremental basis, is expensive. Requiring the docking of wireless mobile devices for the performance of a backup, through reduced expensive wireless air time is inconvenient and unfriendly.

DESCRIPTION OF DRAWINGS

The present invention will be described by way of exemplary embodiments, but not limitations, illustrated in the accompanying drawings in which like references denotes similar elements, and in which.

DETAILED DESCRIPTION

Figure 1:
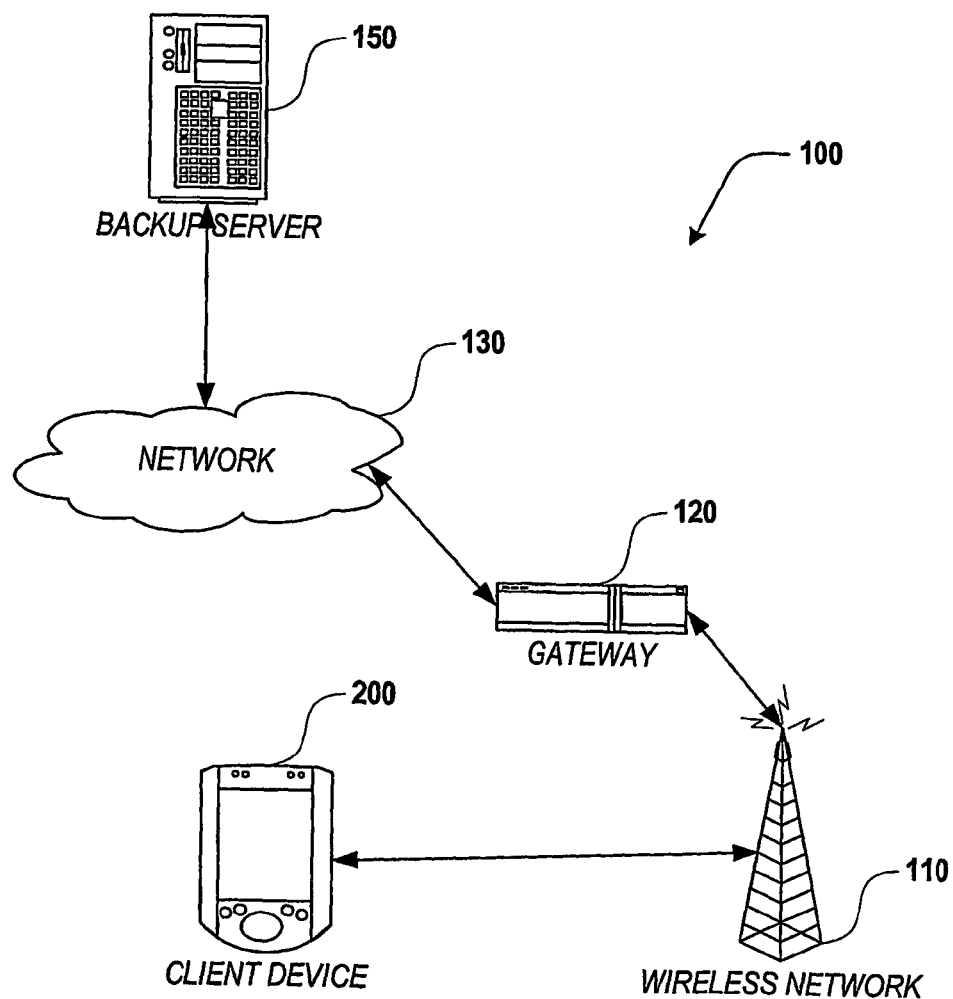
FIG. 1 is a pictorial diagram of a number of devices connected to a network which provide a client device also connected to the network with backup and restoration services in accordance with embodiments of the present invention.

The detailed description which follows is represented largely in terms of processes and symbolic representations of operations by conventional computing components, including processors, memory storage devices for the processors, connected display devices and input devices, all of which are well known in the art. These processes and operations may utilize conventional computing components in a heterogeneous distributed computing environment, including remote storage servers, computer servers and memory storage devices, such processes, devices and operations also being known to those skilled in the art and others. Each of these conventional distributed computing components may be accessible by the processors via a communications network.

Embodiments of the present invention include a "Action Backup" computing application for backing up and restoring data, e.g., via wireless mobile devices, in a more efficient, less costly and more friendly manner. More specifically, the action backup application (hereinafter, "action backup") allows a user to backup and restore files, programs and other data installed in their wireless mobile devices via their wireless connections. The action backup application includes a client portion and a server portion, which are described in turn below.

In one exemplary embodiment of the present invention, the action backup may be configured to perform one or more of the following functions: Incrementally backing up data from a wireless mobile device to a server, performing automatic scheduled backups, performing background backups and restoring data, programs and other data to the wireless mobile device that were previously backed up.

Further, the server portion of action backup will store and track the backed up data and provide storage space for this data. The data that is uploaded to the backup server in one exemplary embodiment is first compressed to save on storage space and to reduce the amount of upload time. The client side of the action backup application also in various embodiments includes filters for excluding some data and/or data locations from backups to the backup server. The restoration function of the action backup application may also be used to restore a user's backup data to another device (e.g., a replacement device).

Briefly, in one exemplary embodiment of the present invention, a user is first presented with a log-on/sign-up screen where the user may log on as an existing user or sign up to begin utilizing the action backup application. Once the user has logged in, they may select from backup, restore or view history (histories of previous backup and restoration sessions). On the server side, also in one exemplary embodiment, the hosting environment includes the server side of the action backup application and a storage area for storing device backups (possibly comprising multiple storage servers). Together, the components facilitate sending and receiving backed up data as well as user and authentication data As previously explained, embodiments of the present invention operate in a wireless network to communicate between wireless mobile devices and backup servers. It will be appreciated by those of ordinary skill in the art that other networks may be used in addition to a wireless network, e.g., the "Internet" which refers to the collection of networks and routers that communicate between each other on a global level using the Internet Protocol ("IP") communications protocol.

FIG. 1 is a pictorial diagram of an exemplary wireless backup system 100 for providing backup services to wireless mobile devices such as client device 200 via a wireless network 110 and other networks 130. For ease of illustration, the client device 200 is shown pictorially as a personal digital assistant ("PDA") in FIG. 1, it being recognized that a large number of client devices in a variety of forms would be included in an actual on-line backup system 100 employing an embodiment of the present invention. In general, the client device 200 has computing capabilities and maybe any form of device capable of communicating with the backup server 150 in various embodiments of the present invention. Thus, while client device 200 is pictorially shown as a PDA, a mobile computer, cellular phone and the like may be equally employed, although these are just representative devices and should be taken as illustrative and not limiting.

The backup storage system 100 functions in a distributed computing environment that includes a plurality of client devices 200, interconnected by a wireless network 110 via a gateway 120 to other networks 130 to a backup server 150. All these connections and communications are interconnected via suitable network connections using suitable network communications protocols. As will be appreciated by those of ordinary skill in the art, the backup server 150 may reside on any device accessible by the client device 200 shown in FIG. 1. An exemplary client device 200 is shown in detail in FIG. 2 and described below.

It will also be appreciated that while the backup server 150 of the backup system 100 is illustrated as a single device, the backup server 150 may actually comprise more than a single device in an actual system practicing embodiments of the present invention. It will also be appreciated that the backup server 150 may be file servers, database servers or a mixture of file servers and database servers.

Figure 2:
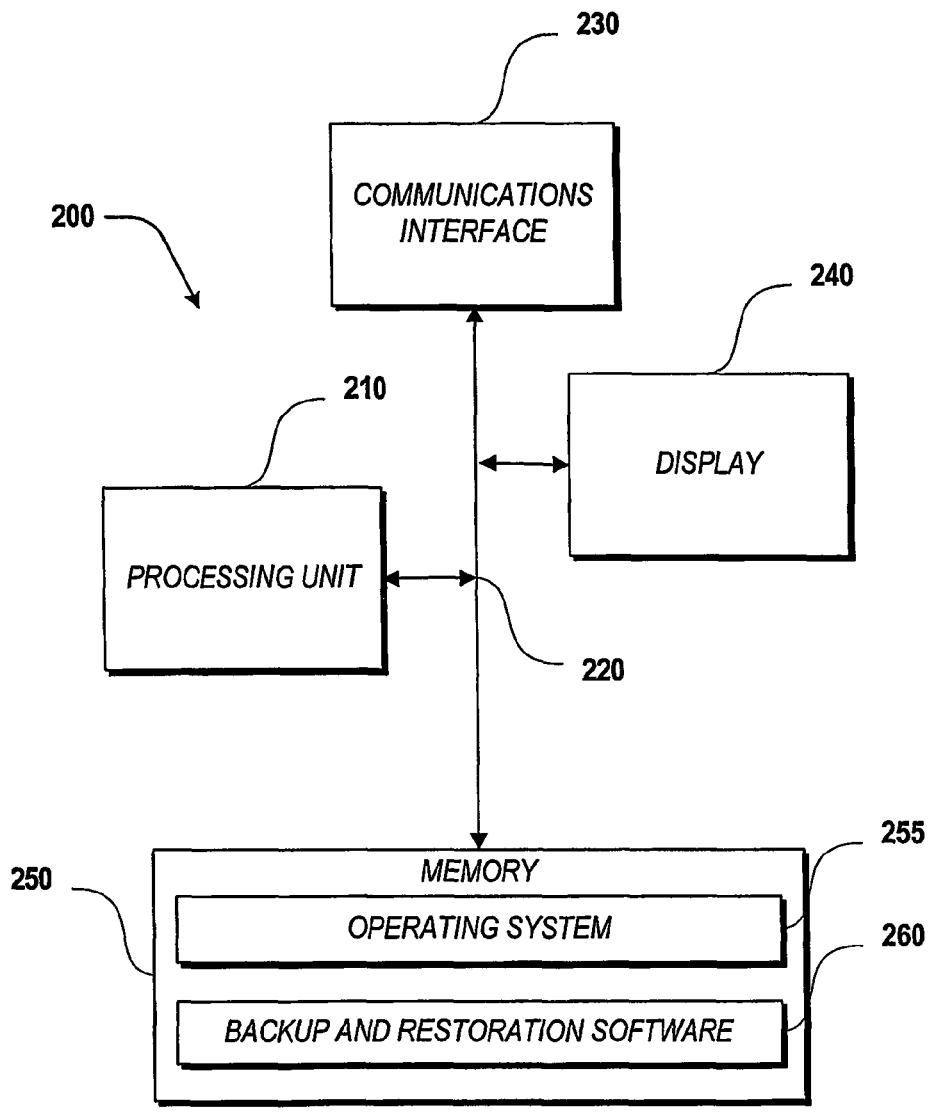
FIG. 2 is a block diagram of the computing device that provides an exemplary operating environment for an embodiment of the present invention.

FIG. 2 illustrates an exemplary computing device 200 suitable for use in embodiments of the present invention. Those of ordinary skill in the art and others will appreciate that the computing device 200 may include many more components than those shown in FIG. 2. However, it is not necessary that all of these generally conventional components be shown in order to disclose an enabling embodiment for practicing the present invention. As shown in FIG. 2, the client device 200 includes a communications interface 230 for connecting to remote devices. Those of ordinary skill in the art will appreciate that the communications interface 230 includes the necessary circuitry, driver and/or transceiver for such a connection, and is constructed for use with the appropriate protocols for such a connection. In one embodiment of the present invention, the communications interface 230 includes the necessary circuitry for a wireless network connection.

The computing device 200 also includes a processing unit 210, a display 240 and a memory 250, all interconnected along with the communications interface 230 via a bus 220. Those of ordinary skill in the art and others will appreciate that the display 240 may not be necessary in all forms of wireless computing devices and accordingly is an optional component. The memory 250 generally comprises a random access memory ("RAM"), a read only memory ("ROM") and a permanent mass storage device, such as a disk drive. The memory 250 stores an operating system 255 and backup and restoration software 260 formed in accordance with embodiments of the present invention. It will be appreciated that these software components may be loaded from a computer readable medium into memory 250 of the client device 200 using a drive mechanism (not shown) associated with the computer readable medium, such as a floppy, tape or DVD/CD-ROM drive or the communications interface 230.

Although an exemplary computing device has been described that generally conforms to conventional computing devices, those of ordinary skill in the art and others will appreciate that a client device 200 may be any of a great number of computing devices capable of communicating remotely with other computing devices. In various embodiments of the present invention, the client device 200 may be a cellular phone, PDA, general purpose computing device and the like.

Figure 3:
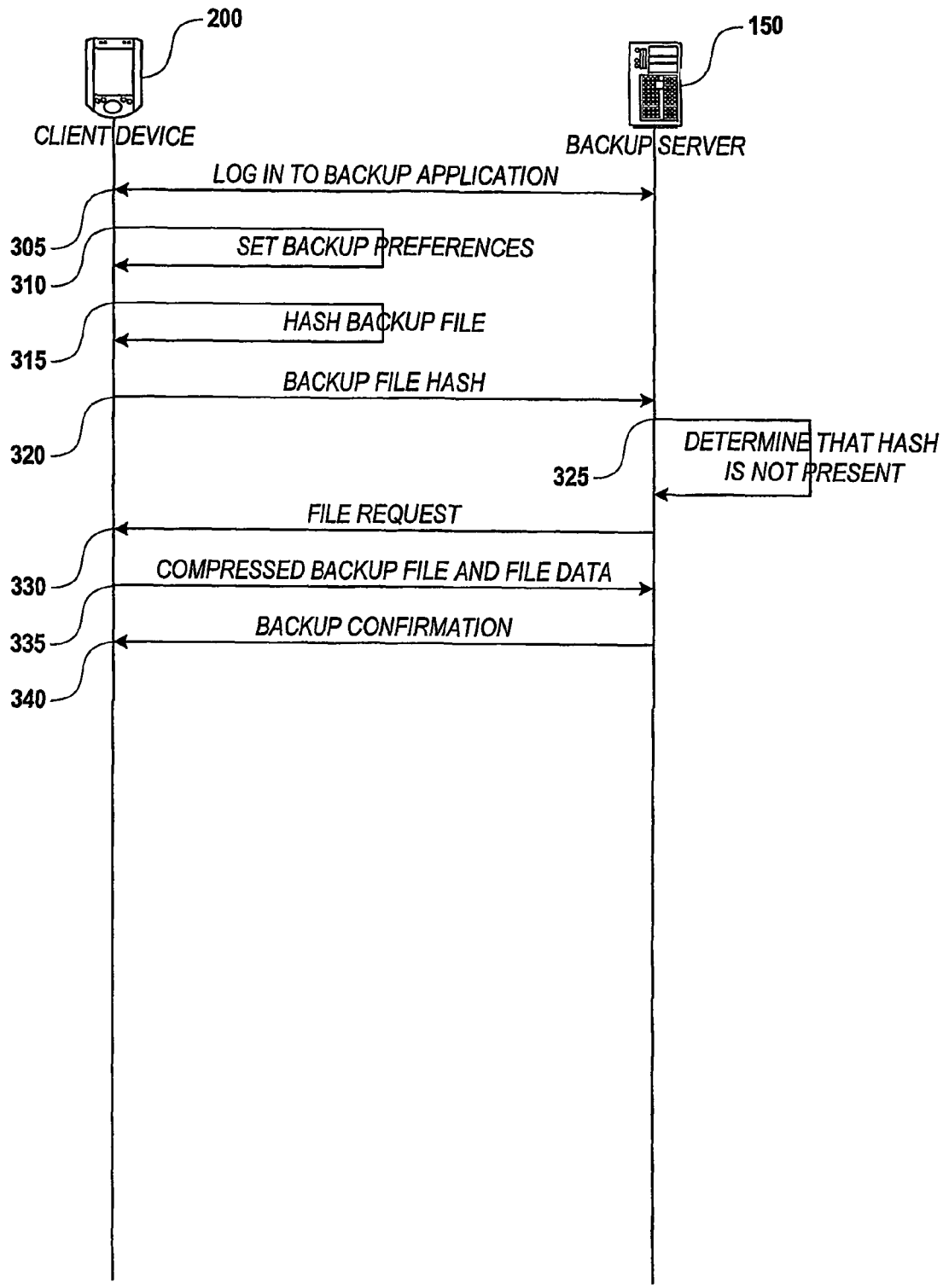
FIG. 3 is a diagram illustrating the actions taken by a client device and backup server to provide backup services in accordance with embodiments of the present invention.

The operation of the backup services of the backup system 100 shown in FIG. 1 will be best understood by reference to FIG. 3, which includes one exemplary sequence of communication interactions between a client device 200 and a backup server 150. It will be appreciated by those of ordinary skill in the art, that the communications from the client device 200 to the backup server 150 may comprise any form of wireless signals, including, but not limited to: radio frequency ("RF") signals, optical signals, audio modulated signals, and electromagnetic signals as well as conventional wire-based signals.

The exemplary communication interactions shown in FIG. 3 begin with the client device 200 sending and receiving 305 log-in information to and from the backup server 150. Such log-in information may be any of the conventional forms of log-in/authentication information communications known to those of ordinary skill in the art (e.g., user name password, cryptographic tokens, certification verifications, etc.)

Next, on the client device the backup preferences are set 310. In the exemplary communication interactions shown in FIG. 3, only a single file will be backed up, those of ordinary skill in the art and others will appreciate that in many embodiments more than a single file or other data will be backed up. However, using a single file will illustrate the steps common to other backups with more than a single backup file. The backup file is then hashed 315 to produce a hash value.

Hashing is typically accomplished by passing an identifier through a "hash function" to generate a "hash value." In one exemplary embodiment of the present invention, the hash function that is used to produce a hash value is a cryptographic hash function, also known as a secure hash algorithm. In general, the properties of the hash functions that are suitable for use with the present invention are those hash functions that are "one way" (i.e., if given y, it is hard to find x such that h (x)=y). Also, the hash function should be "strongly collision free" (i.e., it is very hard to find any pair of messages $x_1$, $x_2$ such that h ($x_1$)=h ($x_2$). A non-limiting listing of suitable secure hash algorithms would include the following hashing algorithms: message digest 2 (MD2), message digest 4 (MD4), message digest 5 (MD5), Korean hash algorithm standard with 160 bit output (HAS 160), HAVAL (using any of its variety of bit lengths), RACE Integrity Primitives Evaluation Message Digest (RIPEMD, including RIPEMD-128, RIPEMD-160, RIPEMD-256 and RIPEMD-320), secure hash algorithm-1 (SHA-1, including SHA-256/384/512), Tiger, Snefru, Fast Fourier Transform Hash (FFT-Hash I and FFT-Hash II), Message Authenticator Algorithm (MAA), Digital Signature Algorithm (DSA), Cell hash, hash function based on additive knapsacks, and hash function based on multiplicative knapsacks.

Those of ordinary skill in the art will appreciate that other deterministic identifying algorithms may be used to produce data identifiers (e.g., cryptographic checksums, and the like). However for purposes of clarity, all such algorithms will be referred to as hashing algorithms that produce hash values.

Next, the client device 200 sends the backup files hash (hash value) 320 to the backup server 150. The backup server 150 then determines whether or not the hash value is present, 325.

Upon determining that the hash value is not present 325, the backup server 150 sends a file request 330 back to the client device 200. The client device 200 then compresses 335 the backup file and any associated file data used by the backup server and sends the compressed file and file data to the backup server. Those of ordinary skill in the art and others will appreciate that a file can be in one exemplary embodiment compressed and sent in an incremental fashion so as not to keep both an uncompressed and a compressed file on the client device 200. The backup server 150 then returns a backup conformation 340 to the client device 200 once all backup files have been received.

However, if the hash value is determined to be present, 325, the operations of 330 and 335 are advantageously skipped.

Figure 4:
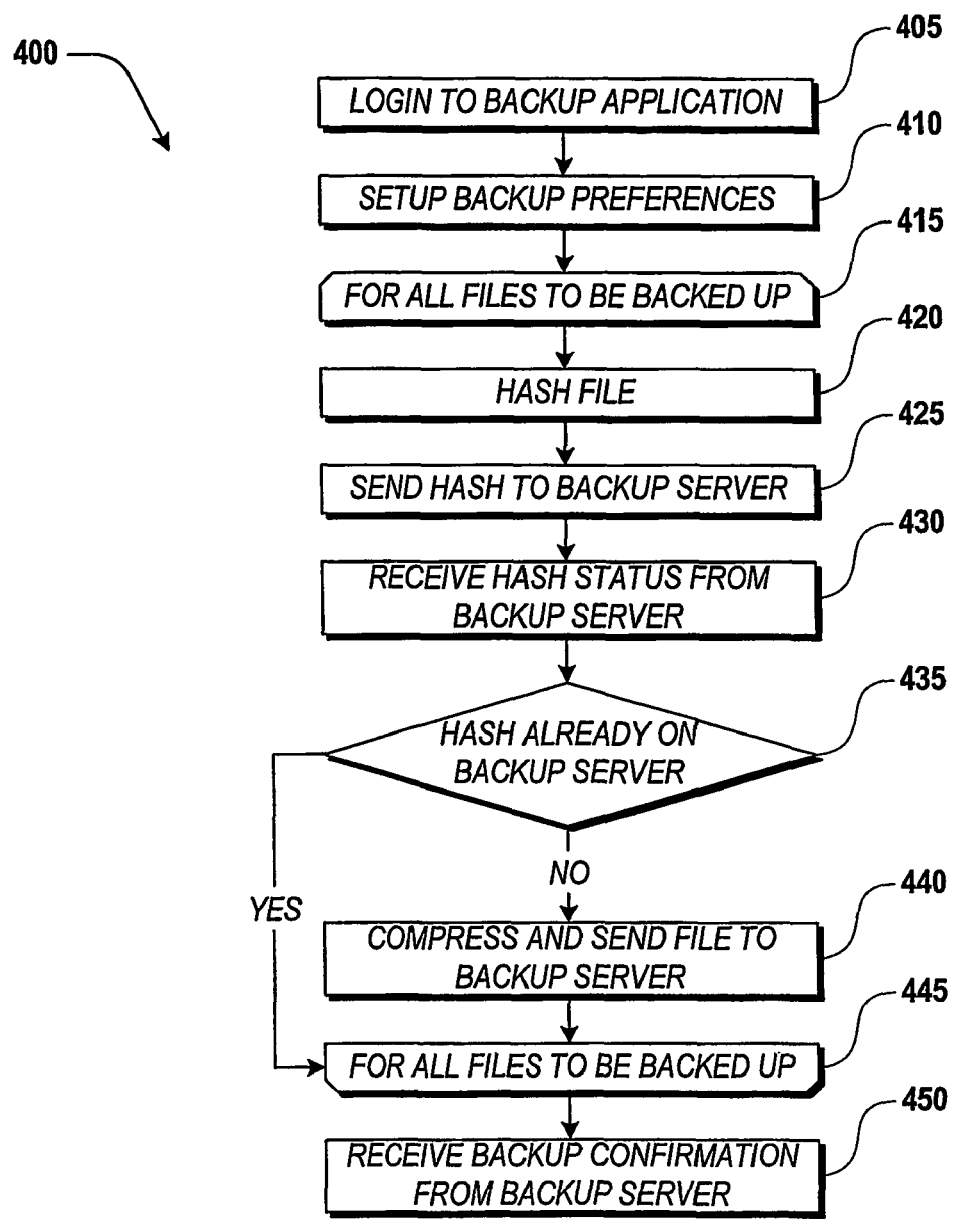
FIG. 4 is a flow diagram illustrating a backup routine in accordance with embodiments of the present invention.

The backup system 100, described herein, includes a client device 200 whose information is to be backed up to a backup server 150. FIG. 4 is a flow diagram illustrating an exemplary client side backup routine 400 suitable for implementation by the client device 200 for backing up data from the client device to the backup server 150. The backup routine 400 begins at block 405, where the user logs into the backup application. As illustrated in FIG. 3, logging into the backup communication may in some exemplary embodiments involve communications with the backup server 150. Backup routine 400 then proceeds to block 410, where backup preferences are set up. In one exemplary embodiment of the present invention, backup preferences involve selecting a type of backup, and possibly the data to include or exclude from the backup. FIGS. 8 and 12-14, illustrate exemplary screen shots 800, 1200, 1300 and 1400 for exemplary preference setting screens for backing up a mobile device. Once the backup preferences have been entered then processing continues to looping block 415, which iterates through all files to be backed up. Next, in block 420, the current file to be backed up is hashed. As described above, hashing involves generating a hash value for the file data using a hash function. Next in block 425, the hash value is sent to the backup server 150. In block 430, the backup server returns a status for the hash value it received. Accordingly, in decision block 435 a determination is made whether the backup server 150 indicated that the hash was already on the backup server. If so, then processing continues to looping block 445, that cycles back to looping block 415 until all files to be backed up have been iterated through. After which, processing proceeds to block 450. If, however, in decision block 435 it was found that the hash value was not on the backup server 150, then processing proceeds to block 440, where the backup file is compressed and sent to the backup server 150 from the client device 200. Next, processing continues to looping block 445 that cycles back to looping block 415 until all files to be backed up have been iterated through. Next, in 450, once all the backup files have been iterated through, a backup confirmation is received from the backup server 150.

Figure 5:
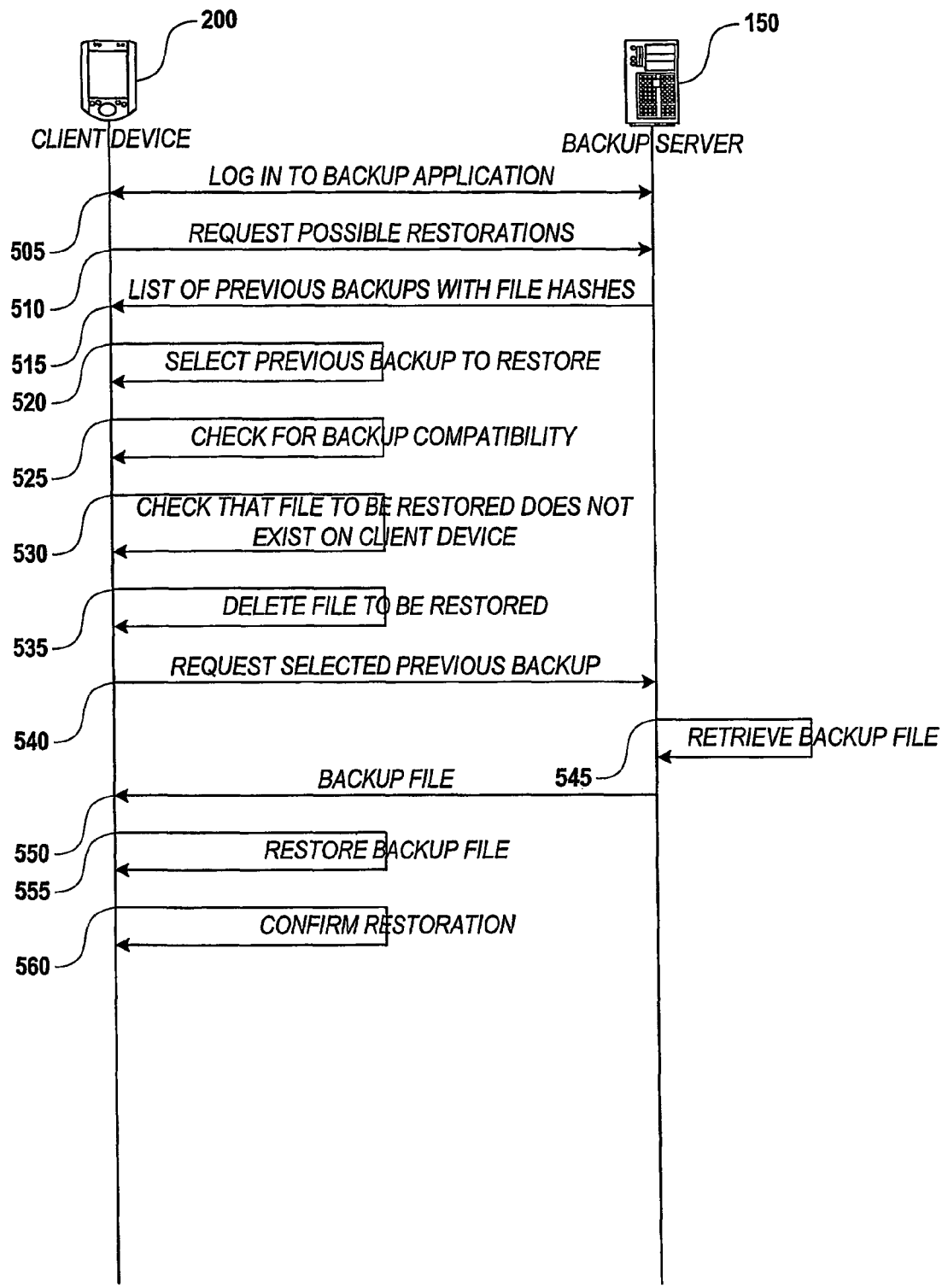
FIG. 5 is a diagram illustrating the actions taken by a client device and backup server to provide restoration services in accordance with embodiments of the present invention.
Figure 10:

Similar to the exemplary sequence of communication interactions shown in FIG. 3, FIG. 5 illustrates one exemplary sequence of communication interactions between a client device 200 and a backup server 150 for restoring data to a client device 200. The exemplary communication interactions shown in FIG. 5, begin with the client device 200 logging in 505 to the backup application and communicating with the backup server 150. As already noted above, any conventional log-in or authentication that is suitable for both authenticating a user may be used. Next, the client device 200 requests 510 possible data restorations from the backup server 150. The backup server then returns a list of previous backups with the file hashes (i.e., the hash values of the backup files) 515 to the client device 200. A user of the client device 200 then selects the 520 a previous backup to restore. Once the backup has been selected, then it is checked 525 for compatibility with the client device 200. The compatibility check may involve checking whether, this is the same device, and/or whether it is a compatible device. In one exemplary embodiment of the present invention a compatible device will still be aloud to restore a backup, however, a warning will be displayed indicating that this backup was created on another device. FIG. 10 illustrates one exemplary screen shot 1000 showing such a warning. Next, the client device 200 checks 530, but the file (or files) to be restored do not already exist on the client device. Those of ordinary skill and of the art and others, will appreciate that this checking is accomplished via comparison of the file hashes received from the backup server 150. As it will be readily appreciated that identical data passed through the same hash function will generate the same hash values, and that an identity of hash values will indicate that a file exists on the client device that is identical to a file being checked for restoration. Next, for the file (or files) to be restored, (i.e., that do not already exist on the client device 200) the files are deleted 535. The client device 200 then requests 540 those files from the selected previous backup that do not already exist on the client device 200. The backup server retrieves the 545 the backup file (or files) to be restored and send the backup file (or files) 550 back to the client device 200. At the client device 200, the backup file (or files) are restored 555 to their locations. The client device 200 then confirms the restoration.

Figure 6:
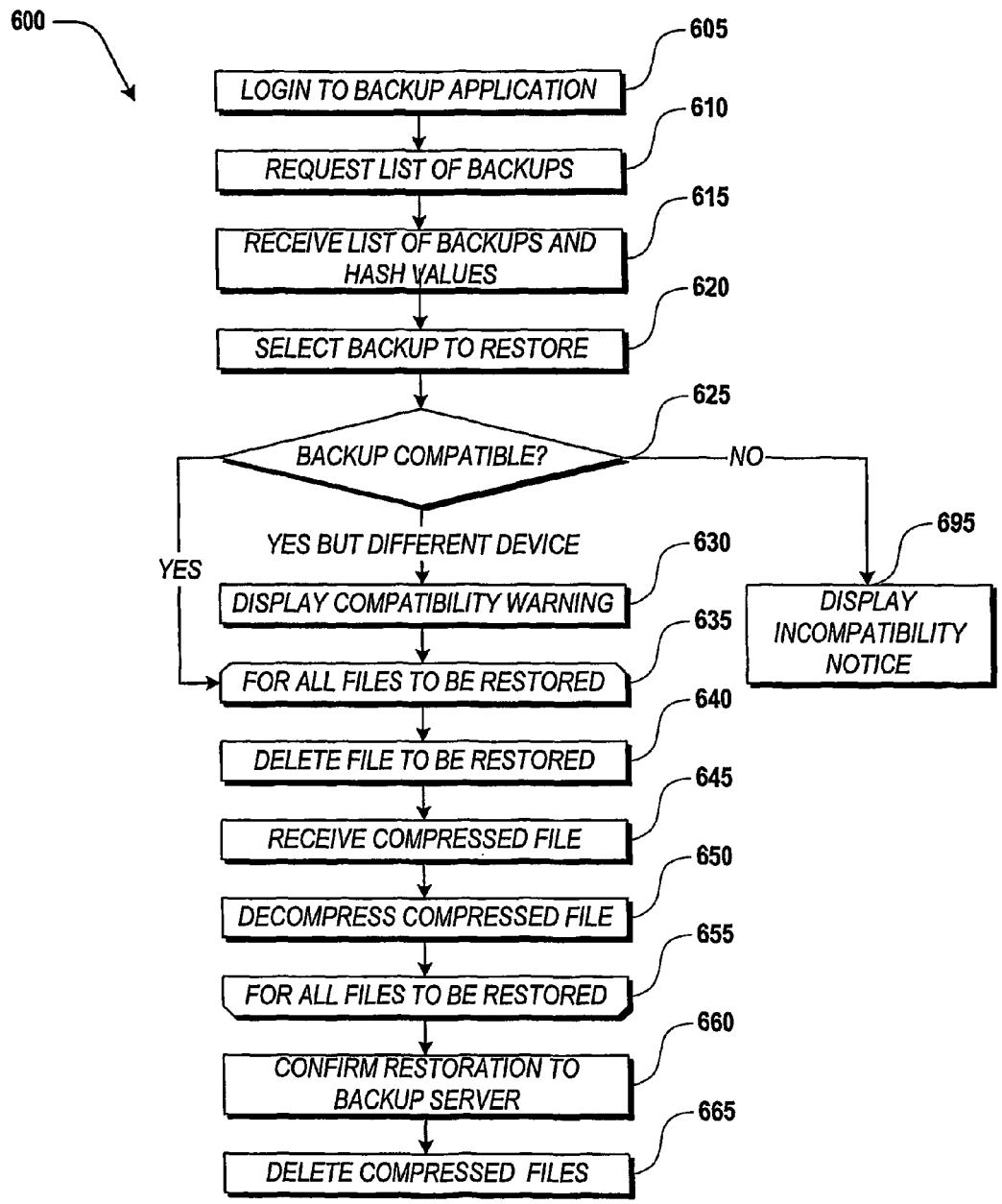
FIG. 6 is a flow diagram illustrating a restoration routine in accordance with embodiments of the present invention.

FIG. 6, illustrates an exemplary restoration routine 600 suitable for implementation by the client device 200, for restoring files from a backup server 150. The restoration routine 600 begins at block 605 with a conventional log-in to the client devices backup application (e.g., backup and restoration software 260). As already noted above, this may involve communications between the client device 200 and backup server 150. Next in block 610 the client device 200 requests a list of possible backups that have already been performed for this account that was logged into in block 605. Those of ordinary skill and of the art will appreciate that accounts may simply be differentiated between log-in and password information or may require further authentication such as, bio-metric and/or hardware tokens (e.g., Smartcards, phone sims, phone identification and/or device identification numbers, etc.) in block 615 the list of previous backups is received. Next, in block 620, a backup to restore is selected. Processing then proceeds to decision block 625.

In decision block 625, if a determination is made whether the selected backup is compatible with the client device 200 and/or it's operating system 255. If in decision block 625, it was determined that the selected backup is not compatible (either with the client device 200 and/or it's operating system 225) then processing proceeds to block 695, where incompatibility notice is displayed and the restoration routine 600 ends. If, however, in decision block 625 was determined that the selected backup was compatible but had been performed on another device, then processing proceeds to block 630, where a compatibility warning is displayed (see for example, screen shot 1000 in FIG. 10) after which processing proceeds to looping block 635. Similarly, if it was determined that the selected backup is compatible, then processing also proceeds to directly to looping block 635.

The iterative process of restoring files begins in looping block 635 and proceeds to block 640, where the current file to be restored is deleted (if it currently exists on the client device 200). Next, the compressed restoration file is received in block 645. In block 650, the compressed restoration file is decompressed to the location it is to be restored to in the client device 200. Those of ordinary skill and of the art and others will appreciate receiving and decompressing a file may be combined in an incremental decompressing to a restored location on the client device 200. Processing then continues to looping block 655, that cycles back to looping block 635 until all files to be restored have been iterated through, at which point processing continues to block 660. In block 660, a restoration confirmation is sent back to the backup server 150 and optionally displayed on the client device 200. In exemplary embodiments of the present invention where compressed files are downloaded and maintained during the restoration process then the restoration routine 600 would continue to block 665, where the compressed files are deleted. It will be appreciated, however, by those of ordinary skill and of the art that in some embodiments of the present invention where an incremental restoration process is used, the compressed files are not maintained on the client device 200 and accordingly there would be no need to delete them.

Figure 7:
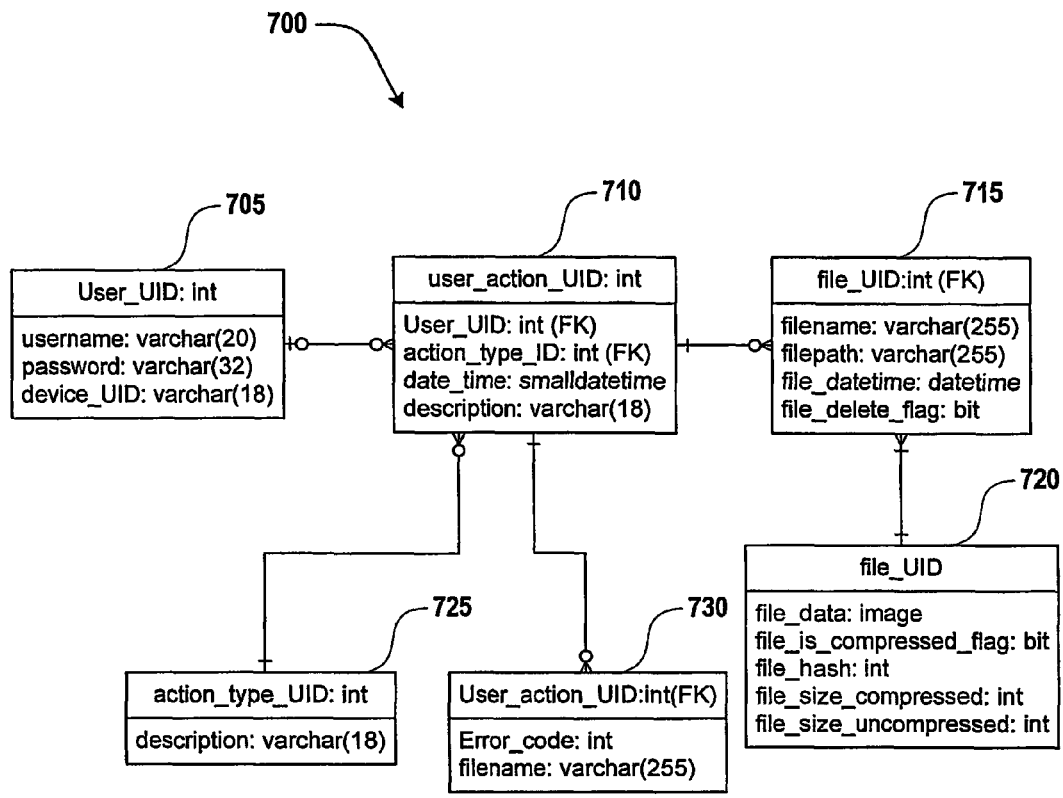
FIG. 7 is an entity relationship diagram representing backed up data at a backup server in accordance with one exemplary embodiment of the present invention.

The previous description of FIGS. 3-6 illustrated the interaction and steps involved in backing up and restoring data to a client device 200. FIG. 7 illustrates an exemplary entity relationship diagram ("ERD") that describes data structures of exemplary backup data stored at the backup server 150. As already described above, the backup data stored at the backup server 150, includes multiple backup files that are associated with particular user accounts but, are not stored in a redundant manner. For identical backed up data, only a single copy of the actual data needs to be stored in various embodiments of the present invention. For example, if ten users have the identical file on their client device 200 and they all back the file up to the same backup server 150, then only a single backup file would be created. However, the backup file would be associated with each of the ten users' accounts.

In FIG. 7, the entity relationship diagram 700 illustrates how backup data is arranged, in accordance with one embodiment. A conventional crow's foot ERD notation is employed in ERD 700. Boxes in the ERD represent entities/objects. The properties of these objects are called attributes and are represented inside each box. The lines connecting the boxes represent relationships between those objects. The relationships are of a variety of types, for example, each line end represents the respective relationship between one object to another.

For example, the user object 705, begins with a zero to one relationship to the user actions object 710, which has a zero to many relationship with the user object 705. Similarly, the user action object 710 has a singular relationship with a user files object 715, but the user files object 715 has a zero to many relationship with the user action object 710. Said more plainly, for there to be a user action, there will be one file that, that action will corresponds to, however, for the user files there are between zero and many possible user actions that may affect the user files from this illustration it can be seen that a line end with a cross and a circle indicates a zero to one relationship, a simple cross indicates a singular relationship, a circle with a three-pronged fork indicates a zero to many relationship and, a cross with a three-pronged fork indicates a single to many relationship.

FIG. 7 provides a high level logical description of the data elements that are used to backup and restore data to and from client devices 200 and backup servers 150. In the ERD 700 the user object 705 includes attributes, such as a user identifier (user_UID), a user name, password, and a device identifier (device_UID).

The user actions object includes attributes of a user action identifier (user_action_UID), and associated user id (user_UID), an action_type (action_type_UD) a date and time and a description.

The user files object 715 includes a file identifier (file_UID), a file name, a file path, a file date and time, and a flag on whether the file should be deleted (file delete_flag). Related to the user files object 715 is the file archive object 720. The archive object 720 also contains a file identifier (file_UID), file data of the file being stored, an indication as to whether the file is compressed (file_is_compressed_flag), a hash value of the file (file_hash) and the sizes of the file in compressed and uncompressed form.

Other objects in the ERD 700 that are related to the user action object or an action type object 725 that includes and action_type identifier (action_type_UID) and a description. Also included is the user action error object 730 that includes a user action identifier, an error code and an associated file name.

It will be appreciated by those of ordinary skill and the art and others, that the ERD 700 represents one of many possible arrangements of data suitable for implementing embodiments of the present invention. Accordingly, it will be appreciated that modifications to the data structures and the ERD 700 that preserve the backup and restoration functionality of the present invention still fall within the spirit and the scope of the present invention.

Figure 8:
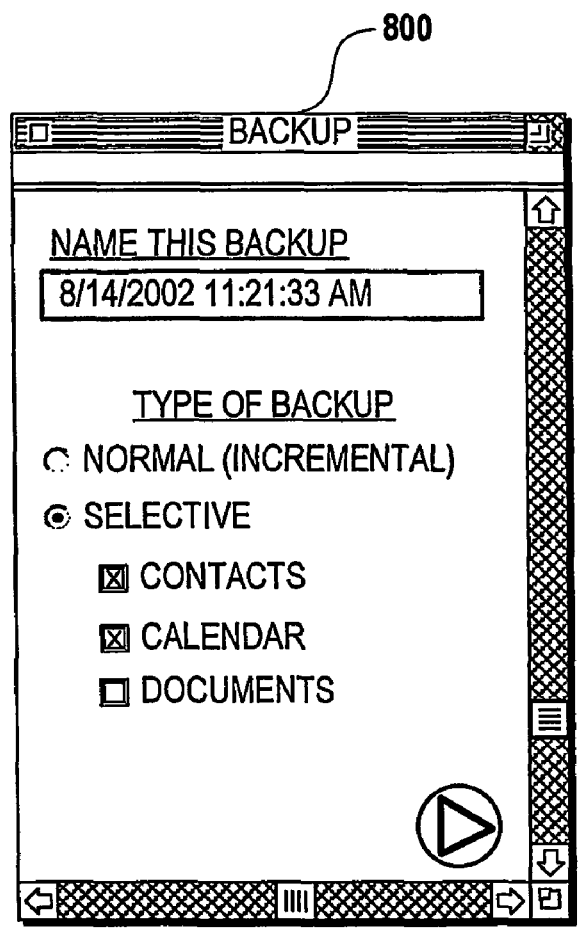
FIGS. 8-14 are exemplary screen shots of backup and restoration displays in accordance with embodiments of the present invention.

FIGS. 8-14 illustrate exemplary screen shots of one exemplary embodiment of the present invention. These exemplary screen shots 800-1400 are presented to enhance the understanding of the present invention but are not meant to be limiting examples of the present invention. FIG. 8 illustrates an exemplary screen shot 800 where a backup may be named and backup options can be selected.

Figure 9:
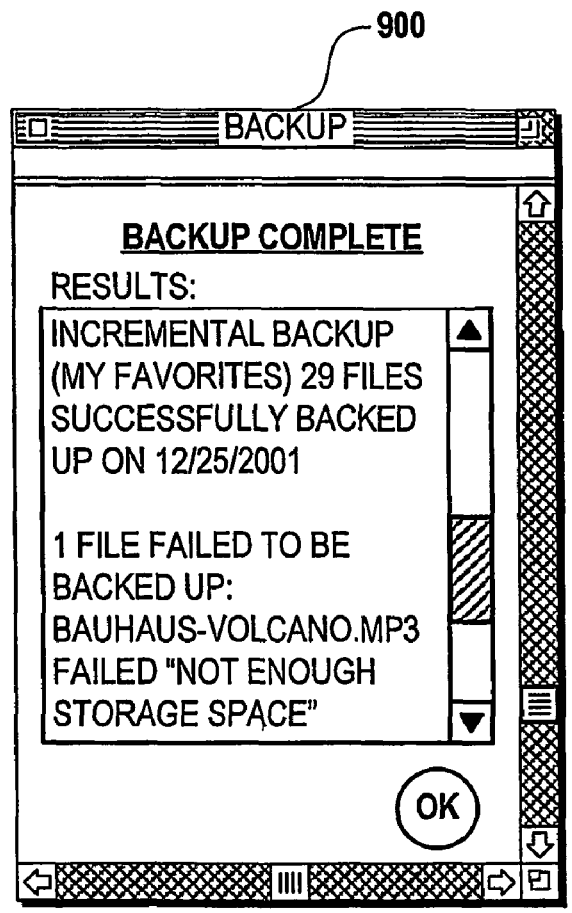

FIG. 9 illustrates a screen shot 900 representative of a display once a backup has been completed.

FIG. 10 represents an exemplary restoration screen shot 1000 with possible backup sessions that may be restored. In addition, screen shot 1000 shows a warning that the Aug. 9, 2002 backup session was created on a different device and includes a warning about assuring compatibility.

Figure 11:
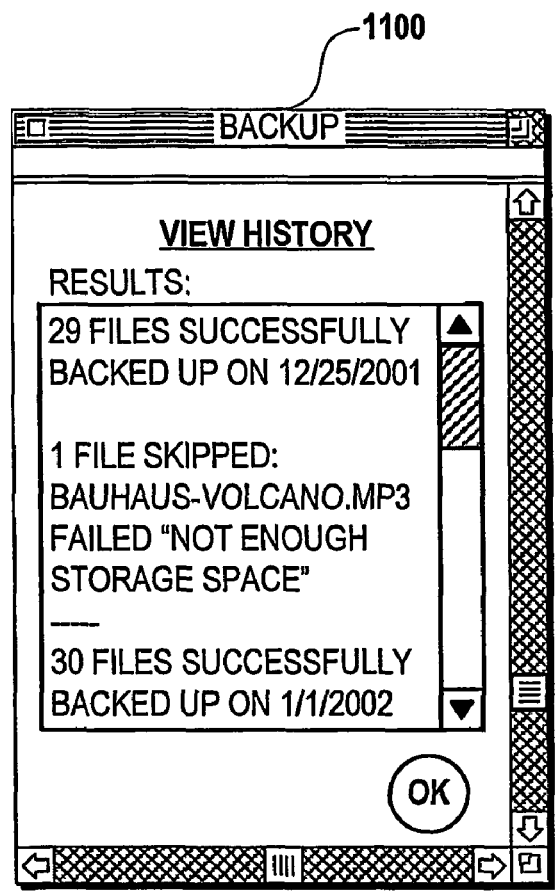

FIG. 11 represents a "view history" screen shot 1100 where backup and restoration history information is displayed on the client device 200.

Figure 12:
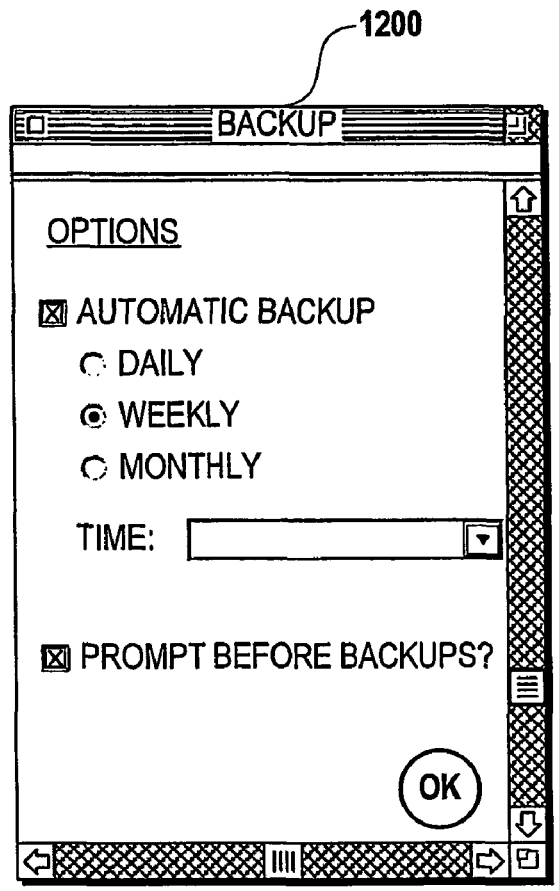

FIG. 12 represents an exemplary backup setup screen shot 1200 that includes further setup and configuration information for backing up client devices 200 in accordance with the present invention.

Figure 13:
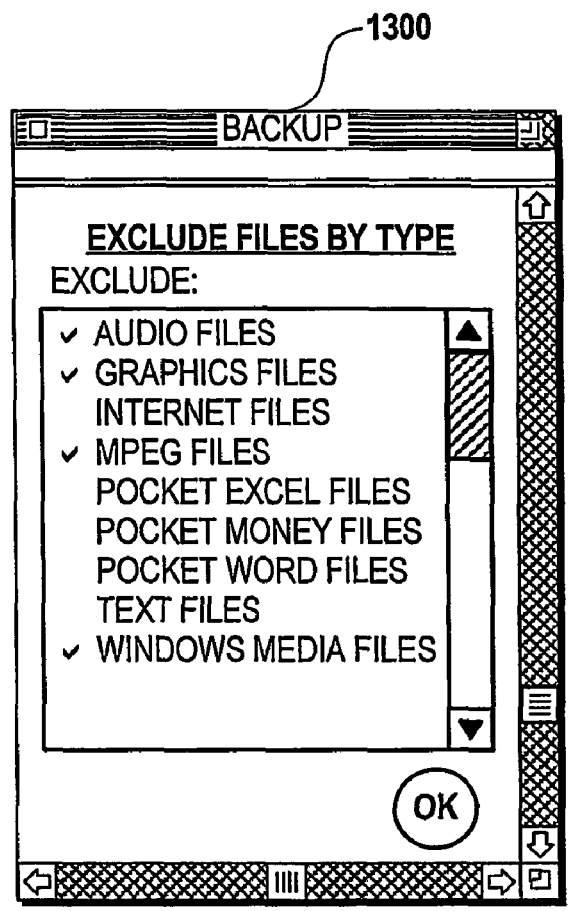

FIG. 13 illustrates a "exclude files by type" screen shot 1300 where a user may select certain types of files to exclude from backups from the client device 200. It will be appreciated by those of ordinary skill and the art that some types of the files are not critical and that the cost of backing these files up is not warranted for such non-critical files. Accordingly, in the screen shot 1300 certain audio files, graphic files, movie files, and media files that often are of a large size and are accordingly expensive in either bandwidth and or monetary costs are excluded.

Figure 14:
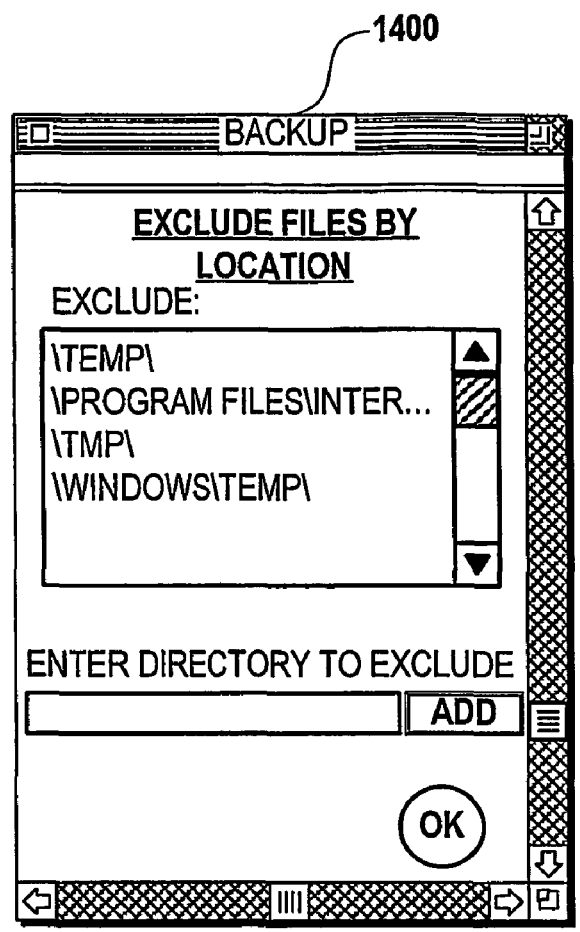

Similar to FIG. 13, FIG. 14 illustrates a "exclude file by location" screen shot 1400 where certain files at a particular file location in the client device 200 are excluded for similar reasons.

Although various embodiments of the present invention have been illustrated and described, it will be appreciated that changes can be made therein without departing from the spirit and scope of the invention as defined by the appended claims. In particular it will be appreciated that while the processes and communication interaction of the present invention have been described in a particular order, those of ordinary skill and the art and others will appreciate that other orders of processes and/or communications interactions will also fall within the spirit and scope of the present invention.

The invention claimed is:

1. A wireless communication apparatus having:
   a processor; and
   a memory comprising computer executable instructions which, upon execution, are operative to cause the wireless communication apparatus to:
   facilitate login, by a user of the wireless communication apparatus, to a user account at a remote backup server, the user account being accessible from the wireless communication apparatus as well as from another computing device of the user;
   facilitate designation, by the user, of data on the wireless communication apparatus to be backed up by the backup server;
   generate a hash value for said designated data;
   communicate a request to the backup server to back up the designated data, including said hash value, to enable said backup server to determine whether said data is already available to said backup server;
   only after said backup server determines that said data was not already earlier made available to said backup server from the wireless communication device or other devices, receive a request from said backup server to send said data to said backup server; and
   send said data to said backup server in response to said request from the backup server, wherein the backup server is configured to store the data, to associate the stored data with said user account as well as other user accounts subsequently wanting to backup the same data, and to provide, on request by the user, the data to the another computing device of the user.

2. The apparatus of claim 1, wherein the apparatus further comprises a transceiver and audio input/output components coupled to the processor and memory.

3. The apparatus of claim 1 wherein the programming instructions, upon execution, are operative to cause the wireless communication apparatus to send said data in compressed form to said backup server.

4. The apparatus of claim 1 wherein said hash value is generated using a cryptographic hashing algorithm.

5. The apparatus of claim 4 wherein said cryptographic hashing algorithm is selected from the group of cryptographic hashing algorithms consisting of: MD2, MD4, MD5, SHA, HAS160, HAVAL, RIPEMD (including RIPEMD-128/160/255/320), TIGER, Snefru, FFT-Hash I, FFT-Hash II, MAA, DSA, Cell hash, hash functions based on additive knapsacks, and hash functions based on multiplicative knapsacks.

6. The apparatus of claim 1 wherein said hash value is a cryptographic checksum.

7. The apparatus of claim 1 wherein said hash value is wirelessly communicated via a communication medium selected from the group consisting of: RF signals, optical signals, audio modulated signals, and electromagnetic signals.

8. The apparatus of claim 1, wherein the programming instructions, upon execution, are operative to cause the wireless communication apparatus to facilitate a user in designating a data type not to backup from the wireless communication apparatus.

9. The apparatus of claim 1, wherein the programming instructions, upon execution, are operative to cause the wireless communication apparatus to facilitate a user in designating a data location not to backup from the wireless communication apparatus.

10. A wireless communication apparatus having a processor; and
   a memory comprising computer executable instructions which, upon execution, are operative to cause the wireless communication apparatus to:
   facilitate a user of the wireless communication apparatus in logging into a user account of the user on a backup server, using the wireless communication apparatus, the user account being accessible from the wireless communication apparatus as well as from another computing device of the user;
   request a list of backups associated with the user account from the backup server, wherein the backups include backups performed for the wireless communication apparatus, and wherein the backups performed for the wireless communication apparatus include backups taken from the wireless communication apparatus and backups taken from other devices;
   receive from the backup server the list of backups associated with the user account;
   facilitate a user of the wireless communication device in selecting a previous backup from among the list of backups associated with the user account ;
   determine whether the requested previous backups are not on the wireless communication device, and whether the requested previous backups are compatible with the wireless communication apparatus;
   only on determining that the selected previous backups are currently not on the wireless communication apparatus and are compatible with the wireless communication apparatus, request the selected previous backups from the backup server; and
   receive said requested previous backups from said backup server.

11. A method of backing up a wireless communication device, the method comprising:
   facilitating, by the wireless communication device, login by a user of the wireless communication device, to a user account of the user at a backup server, the user account being accessible from the wireless communication device and from another computing device of the user;
   facilitating, by the wireless communication device, the user in designating data on the wireless communication device to be backed up by the backup server;
   generating, by the wireless communication device, a hash value for said designated data;
   communicating by the wireless communication device, said hash value to the backup server to enable said backup server to determine whether said data was already previously made available to said backup server from the wireless communication device or another device; and
   only after said backup server indicates that said data is not already previously made available to said backup server, sending, by the wireless communication device, said data to said backup server to enable the backup server to store the data, associate the data with the user account and other user accounts wanting to have the same data backup, and provide the data, on request of the user, to the other computing device of the user.

12. The method of claim 11 wherein said generating comprises generating the hash value using a cryptographic hashing algorithm.

13. The method of claim 11 wherein facilitating comprises facilitating a user of the wireless communication device in designating a data type not to backup from the wireless communication device.

14. The method of claim 11 wherein facilitating comprises facilitating a user of the wireless communication device in designating a data location not to backup from the wireless communication device.

15. A method of restoring data to a wireless communication device, the method comprising:

facilitating a user of the wireless communication device, by the wireless communication device, in logging into a user account of the user on a backup server;

sending to the backup server, by the wireless communication device, a request for a list of backups associated with the user account, wherein the list of backups includes backups performed for the wireless communication device, wherein the backups performed include backups taken from the wireless communication device, and backups taken from other devices;

receiving from the backup server, by the wireless communication device, the list of backups associated with the user account;

enabling, by the wireless communication device, a user of the wireless communication device in selecting a previous backup from the list;

checking by the wireless communication device, whether the selected previous backup is on the wireless communication device and whether the selected previous backup is compatible with the wireless communication device;

only after the selected previous backup has been determined to be not on the wireless communication device and to be compatible with the wireless communication device, requesting from the backup server, by the wireless communication device, the selected previous backup; and receiving by the wireless communication device said requested previous backup from said backup server.

* * * * *